United States Patent
Suzuki et al.

(10) Patent No.: US 6,766,681 B2
(45) Date of Patent: Jul. 27, 2004

(54) MALFUNCTION DETECTION DEVICE OF A BELLOWS TYPE ACCUMULATOR FOR PRESSURIZED FLUID

(75) Inventors: Kenichi Suzuki, Aichi-ken (JP);
Tetsuya Sato, Aichi-ken (JP); Tadao Saito, Nagoya (JP); Takashi Kurokawa, Nagoya (JP); Yasunori Sakata, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/118,429

(22) Filed: Apr. 9, 2002

(65) Prior Publication Data

US 2002/0162381 A1 Nov. 7, 2002

(30) Foreign Application Priority Data

Apr. 9, 2001 (JP) ........................................ 2001-110573

(51) Int. Cl.$^7$ .............................................. G01M 3/02
(52) U.S. Cl. ................................ 73/37; 73/39; 73/49.3; 303/87
(58) Field of Search ............................ 73/37, 39, 49.3; 303/87

(56) References Cited

U.S. PATENT DOCUMENTS 5,924,196 A * 7/1999 Sasaki et al. ............ 29/890.06

FOREIGN PATENT DOCUMENTS

| JP | 2000-249101 A | | 9/2000 | |
| JP | 2002-98101 A | * | 4/2002 | ............ F15B/1/02 |

* cited by examiner

Primary Examiner—Hezron Williams
Assistant Examiner—André K. Jackson
(74) Attorney, Agent, or Firm—Burns, Doane, Swecker & Mathis, L.L.P.

(57) ABSTRACT

A malfunction detection device of a bellows type accumulator for pressurized fluid includes malfunction judgment unit for judging a malfunction of the bellows type accumulator on the basis of a detection output of the pressure sensor. The malfunction judgement unit judges that the malfunction of the seal member generates when the difference between a peak pressure value appeared before a predetermined time is past after the starting of the pressure increase from a value below a predetermined value in the inlet and outlet port and a stable fluid pressure appeared after the appearance of the peak pressure value is not within a predetermined range and/or when the peak pressure value does not appear before the progress of the predetermined time.

4 Claims, 7 Drawing Sheets

MALFUNCTION DETECTION DEVICE OF A BELLOWS TYPE ACCUMULATOR FOR PRESSURIZED FLUID

CROSS REFERENCE TO RELATED APPLICATIONS

This application is based on and claims priority under 35 U.S.C. § 119 with respect to a Japanese Patent Application 2001-110573, filed on Apr. 9, 2001, the entire content of which is incorporated herein by reference.

FIELD OF THE INVENTION

This invention relates to a malfunction detection device of a bellows type accumulator for pressurized fluid.

BACKGROUND OF THE INVENTION

A conventional accumulator of this kind for storing pressurized fluid is disclosed in, for example, Japanese Patent Laid-Open Publication No. 2000-249101. This accumulator includes a shell which forms a pressure space, a bellows located in the pressure space, made of metal and so on and whose one end is fluid tightly fixed to one end wall of the shell and whose other end is fluid tightly fixed to a movable plate, a gas chamber which is formed inside of the bellows and in which pressurized gas is enclosed and a fluid chamber which is formed outside of the bellows and which communicates to an inlet and outlet port formed on the other end wall of the shell.

A seal member which is made of rubber and so on is provided on a face of the movable plate being opposite to the other end wall of the shell. When the pressure in the fluid chamber is lower than the pressure in the gas chamber and thereby the bellows extends so that the length of the bellows reaches to a predetermined length, a ring shaped sealing surface of the seal member contacts with an inner surface of the other end wall of the shell and the fluid in the fluid chamber is prevented from flowing into the inlet and outlet port. As a result, the pressure in the fluid chamber is balanced with the pressure in the gas chamber and a stress in excess of a permissible stress is prevented from being applied to the bellows.

In the above mentioned bellows type accumulator, when the seal member is damaged, an amount of fluid can leak from the fluid chamber to the inlet and outlet port under the condition that the sealing surface of the seal member contacts with the other end wall of the shell. The pressure in the fluid chamber then becomes lower than the pressure in the gas chamber and the stress which is applied to the bellows exceeds the permissible stress. As a result, the bellows is deformed non-elastically. In this condition, when the increase and decrease of the fluid pressure in the inlet and outlet port is repeated and the expansion and contraction of the bellows is repeated, the bellows is destroyed.

A need exists for a malfunction detection device of a bellows type accumulator which can solve the drawback of the known accumulator.

SUMMARY OF THE INVENTION

A malfunction detection device of a bellows type accumulator for pressurized fluid comprises the bellows type accumulator including a shell which forms a pressure space, a bellows located in the pressure space and whose one end is fluid tightly fixed to one end wall of the shell and whose other end is fluid tightly fixed to a movable plate, a gas chamber which is formed inside of the bellows and in which pressurized gas is enclosed, a fluid chamber which is formed outside of the bellows and which communicates to an inlet and outlet port formed on the other end wall of the shell and a seal member which is provided on one of the movable plate or the other end of the shell and which contacts with the other of the movable plate or the other end of the shell for preventing the fluid from flowing from the fluid chamber to the inlet and outlet port, a pressure sensor which detects the fluid pressure in the inlet and outlet port and malfunction judgment means for judging a malfunction of the bellows type accumulator on the basis of a detection output of the pressure sensor, wherein the malfunction judgment means judge the seal member.

BRIEF DESCRIPTION OF THE DRAWING FIGURES

A more complete appreciation of the invention and other advantages thereof will be readily obtained as the same becomes better understood by reference to the following detailed description when considered in connection with the accompanying drawings, in which.

DETAILED DESCRIPTION OF THE INVENTION

Having generally described the present invention, a further understanding of the invention can be obtained now according to embodiment of the present invention with reference to FIGS. 1 to 8 in accompanying drawings.

Figure 1:
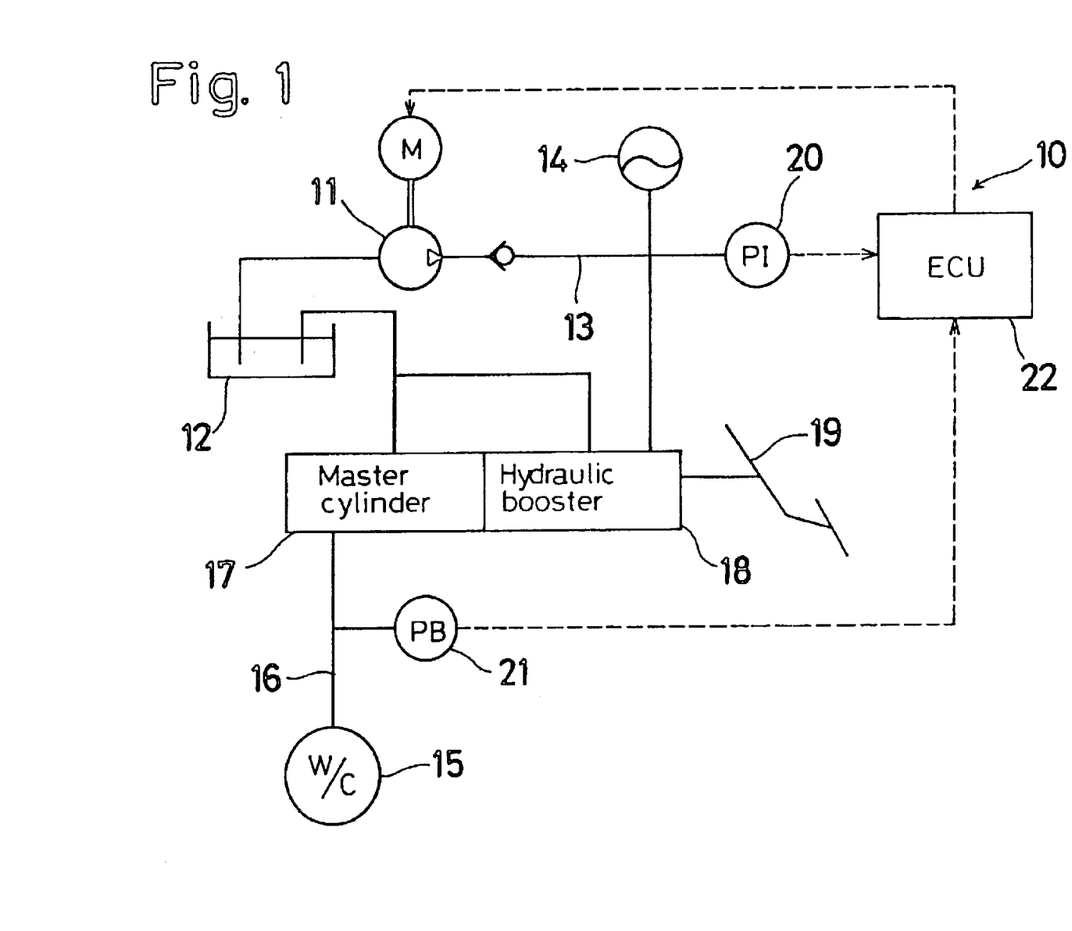
FIG. 1 is a schematic illustration of a malfunction detection device of a bellows type accumulator for pressurized fluid according to the present invention.

FIG. 1 is a schematic illustration of a malfunction detection device of a bellows type accumulator for pressurized fluid according to an embodiment of the present invention. In FIG. 1, a fluid pump 11 pumps fluid from a reservoir 12, pressurizes the fluid and supplies the pressurized fluid to a bellows type accumulator 14 via a fluid passage 13. A master cylinder 17 which supplies the brake pressure to a wheel cylinder 15 via a brake pressure passage 16 is operated by a hydraulic booster 18. The hydraulic booster 18 includes a regulator valve (not shown) which regulates the fluid pressure supplied from the accumulator 14 via the fluid passage 13 to a pressure corresponding to the depressing force of a brake pedal 19. The hydraulic booster 18 operates the master cylinder 17 by the regulated pressure. A pressure sensor 20 for detecting the fluid pressure P1 in the fluid passage 13 is connected to the fluid passage 13. A pressure sensor 21 which detects the fluid pressure PB in the brake pressure passage 16 is connected to the brake pressure passage 16. Outputs of the pressure sensors 20 and 21 are fed to an electric control unit (ECU) 22. The electric control unit 22 controls the operation of the fluid pump 11 on the basis of the detection output of the pressure sensor 20 and thereby functions as accumulated pressure control means for maintaining the fluid pressure in the accumulator 14 between a predetermined lower limit value and a predetermined upper limit value. Further, the electric control unit 22 functions as malfunction judgment means for judging a malfunction of the bellows type accumulator 14.

Figure 2:
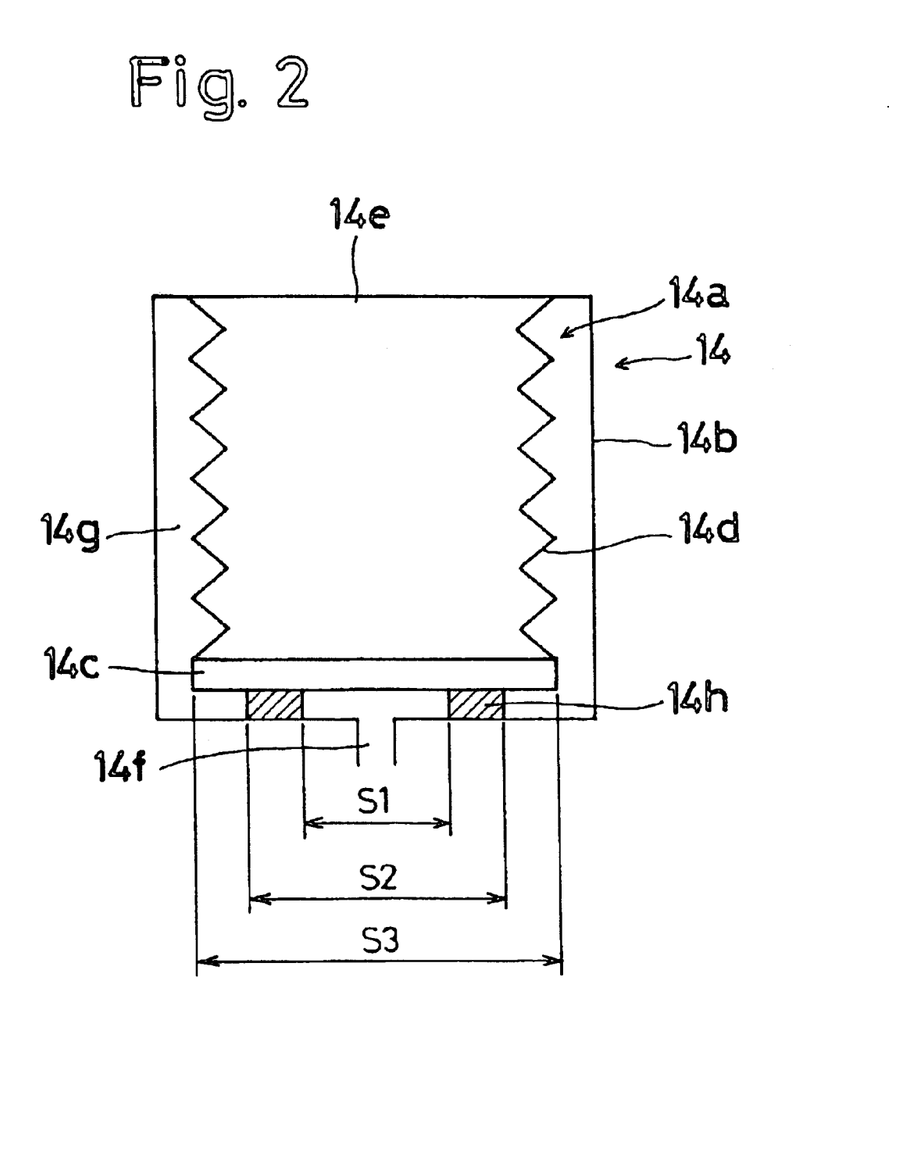
FIG. 2 is a schematic illustration of a bellows type accumulator for pressurized fluid shown in FIG. 1.

FIG. 2 is a schematic illustration of the bellows type accumulator 14 shown in FIG. 1. In FIG. 2, the accumulator 14 includes a shell 14b which forms a pressure space 14a, a bellows 14d located in the pressure space 14a, made of metal and so on and whose upper end is fluid tightly fixed to an upper end wall of the shell 14b and whose lower end is fluid tightly fixed to a movable plate 14c, a gas chamber 14e which is formed inside of the bellows 14d and in which pressurized gas is enclosed and a fluid chamber 14g which is formed outside of the bellows 14d and which communicates to an inlet and outlet port 14f formed on a lower end wall of the shell 14b.

A seal member 14h which is made of rubber is provided on a face of the movable plate 14c being opposite to the lower end wall of the shell 14b. When the pressure in the fluid chamber 14g is lower than the pressure in the gas chamber 14e and thereby the bellows 14d extends so that the length of the bellows 14d reaches to a predetermined length, a ring shaped sealing surface (a lower end surface) of the seal member 14h contacts with an inner surface of the lower end wall of the shell 14b as shown in FIG. 2 and the fluid in the fluid chamber 14g is prevented from flowing into the inlet and outlet port 14f. Thereby, the pressure in the fluid chamber 14g is balanced with the pressure in the gas chamber 14e and it is prevented that a stress being exceed a permissible stress is applied to the bellows 14d.

In FIG. 2, S1 is an area which is determined by the inner diameter of the sealing surface of the seal member 14h and to which the fluid pressure P1 in the inlet and outlet port 14f (the fluid pressure in the fluid passage 13 in FIG. 1) is applied so as to push the movable plate 14c upwardly. S3 is an area to which the gas pressure P2 in the gas chamber 14e is applied so as to push the movable plate 14c downwardly. S2 is an area which is determined by the outer diameter of the sealing surface of the seal member 14h. The area S3 is larger than the area S2 and the area S2 is larger than the area S1 (S3>S2>S1). The outer diameter of the area S2 is smaller than the outer diameter of the area S3. The fluid pressure P3 in the fluid chamber 14g is applied to an area corresponding to the difference between the areas S2 and S3 and pushes the movable plate 14c upwardly.

In case that the seal member 14h is not damaged and the sealing function of the seal member 14h is normal, even if the fluid pressure P1 in the inlet and outlet port 14f is 0 (zero), the fluid pressure P3 in the fluid chamber 14g is maintained so as to be the same as the gas pressure P2 in the gas chamber 14e. Thereby, when the fluid pump 11 begins to operate and the fluid pressure P1 in the inlet and outlet port 14f is increased, the fluid pressure P1 in the inlet and outlet port 14f increases suddenly to a pressure corresponding to S2/S1×P2. When the fluid pressure P1 reaches to the pressure corresponding to S2/S1×P2, the seal member 14h is separated from the inner surface of the lower end wall of the shell 14b and the inlet and outlet port 14f communicates to the fluid chamber 14g. Thereby, the fluid pressure P1 decreases suddenly lower than the fluid pressure P2 and after that the fluid pressure P1 recovers to the fluid pressure P2. Then the fluid pressure P1 becomes stable and after that the fluid pressure P1 increases gradually. This change of the fluid pressure P1 is shown in FIG. 3.

On the contrary, in case that the seal member 14h is damaged slightly and a very little fluid leak from the fluid chamber 14g to the inlet and outlet port 14f generates in FIG. 2, when the condition under which the fluid pressure P1 in the inlet and outlet port 14f is 0 (zero) continues for a long time, the fluid pressure P3 in the fluid chamber 14g decreases to 0 (zero). When the fluid pump 11 begins to operate under the condition which the fluid pressure P3 is 0 (zero) and the fluid pressure P1 in the inlet and outlet port 14f is increased, the fluid pressure P1 in the inlet and outlet port 14f increases suddenly to a pressure corresponding to S3/S1×P2. When the fluid pressure P1 reaches to the pressure corresponding to S3/S1×P2, the seal member 14h is separated from the inner surface of the lower end wall of the shell 14b and the inlet and outlet port 14f communicates to the fluid chamber 14g. Thereby, the fluid pressure P1 decreases suddenly lower than the fluid pressure P2 and after that the fluid pressure P1 recovers to the fluid pressure P2. Then the fluid pressure P1 becomes stable and after that the fluid pressure P1 increases gradually. This change of the fluid pressure P1 is shown in FIG. 4.

When the seal member 14h is damaged severely and the extensive fluid leak from the fluid chamber 14g to the inlet and outlet port 14f is generated in FIG. 2, the fluid chamber 14g communicates to the inlet and outlet port 14f and the fluid pressure P3 in the fluid chamber 14g becomes 0 (zero) if the fluid pressure P1 in the inlet and outlet port 14f is 0 (zero). When the fluid pump 11 begins to operate under the condition which the fluid pressure P3 is 0 (zero) and the fluid pressure P1 in the inlet and outlet port 14f is increased, the fluid pressure P1 in the inlet and outlet port 14f increases suddenly to the fluid pressure P2 and becomes stable. After that the fluid pressure P1 increases gradually. This change of the fluid pressure P1 is shown in FIG. 5. In FIG. 3 and FIG. 4, a peak pressure appears before the fluid pressure P1 becomes stable. In FIG. 5, however, such peak pressure does not appear.

Figure 3:
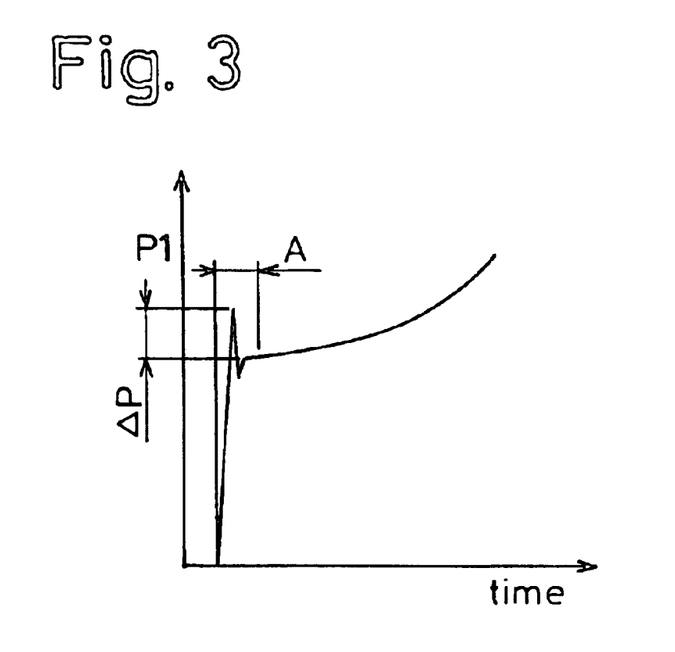
FIG. 3 is a graph showing the change of the pressure of the inlet and outlet port when the fluid pressure has begun to store under the condition that the seal member is not damaged.
Figure 4:
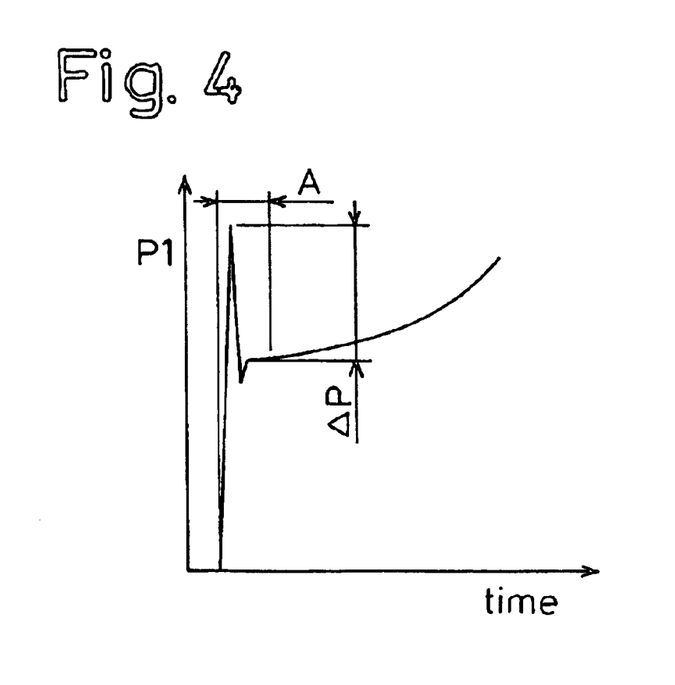
FIG. 4 is a graph showing the change of the pressure of the inlet and outlet port when the fluid pressure has begun to accumulate under the condition that the seal member is damaged slightly.
Figure 5:
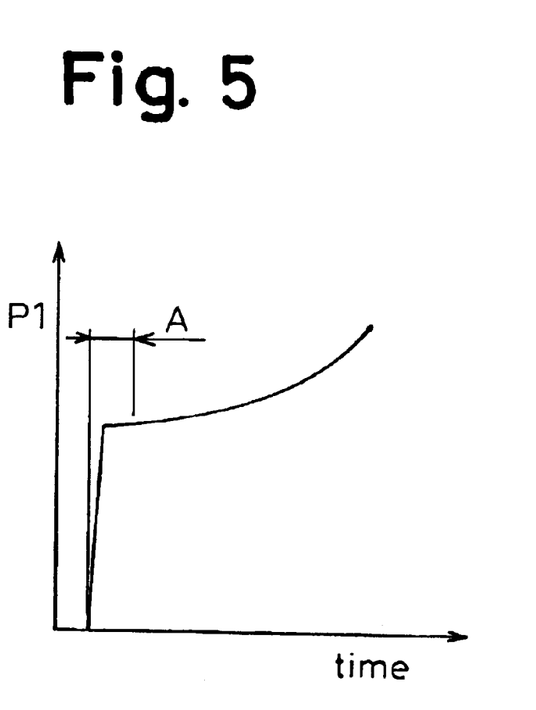
FIG. 5 is a graph showing the change of the pressure of the inlet and outlet port when the fluid pressure has begun to accumulate under the condition that the seal member is damaged severely.

In FIGS. 3 to 5, a time A which is spent from the starting of the fluid pump 11 to the stability of the fluid pressure P1 is changed in response to the depression of the brake pedal 19 at the starting of the fluid pump 11. In the case that the brake pedal 19 is depressed, the hydraulic booster 18 consumes the pressurized fluid in the side of the fluid passage 13. Thereby, if the time A is K2 when the brake pedal 19 is not depressed, the time A becomes K3 larger than K2 when the brake pedal 19 is depressed. Further, in FIG. 3 and FIG. 4, the difference ΔP between the peak pressure value appeared before the progress of the time A and the stable pressure value appeared after the appearance of the peak pressure in FIG. 4 is far larger than that in FIG. 3. ΔP in FIG. 3 scatters by various factors. However, an upper limit ΔPa and a lower limit ΔPb can be obtained by experimentations.

As mentioned above, the change of the fluid pressure P1 just after the fluid pump 11 has begun to operate under the condition that the pressure in the fluid passage 13 is under the fluid pressure P2 is different in response to the good and bad of the sealing function of the seal member 14h. In this embodiment, the presence of the malfunction of the bellows type accumulator 14 is detected by the utilization of this difference.

Figure 6:
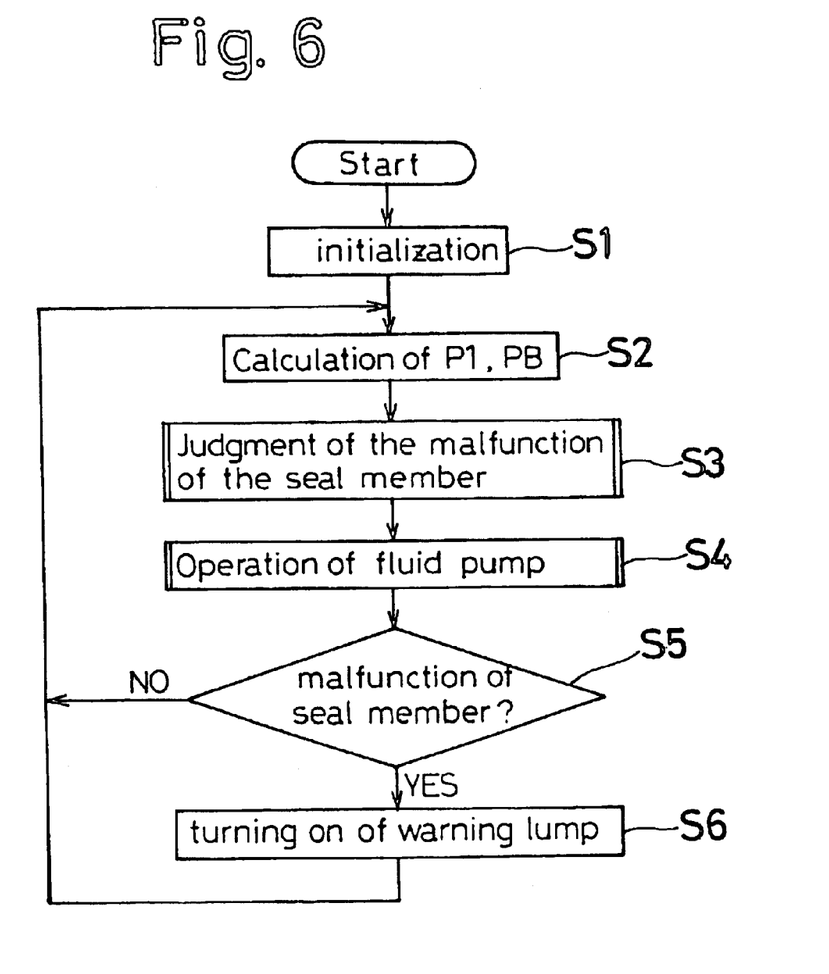
FIG. 6 is a flow chart showing the operation of the electric control unit shown in FIG. 1.

FIG. 6 is a flow chart showing processes of the electric control unit 22 as the accumulated pressure control means and malfunction judgment means. A series of processes shown in FIG. 6 are carried out with a predetermined operation period.

In FIG. 6, when an ignition switch is turned on, initialization is performed at the step S1 and then the fluid pressures P1 and PB are calculated on the basis of the detection outputs of the pressure sensors 20 and 21 at the step S2. Then, the judgment of the malfunction of the seal member 14h is performed at the step S3 and the fluid pump 11 is operated at step S4. Then, at the step S5, it is judged whether the result of the judgment at the step S3 is the malfunction of the seal member or not. When the result of the judgment at the step S3 is the malfunction of the seal member, a warning lamp is turned on at the step S6 and then the step S2 is performed. When the judgment at the step S3 is not the malfunction of the seal member, the step S2 is performed. In the step S4, when the fluid pressure P1 becomes lower than the predetermined lower limit value, the fluid pump 11 begins to operate. The fluid pump 11 is stopped when the predetermined time is past after the fluid pressure P1 reaches a set value which is in the neighborhood of the predetermined upper limit value.

Figure 7:
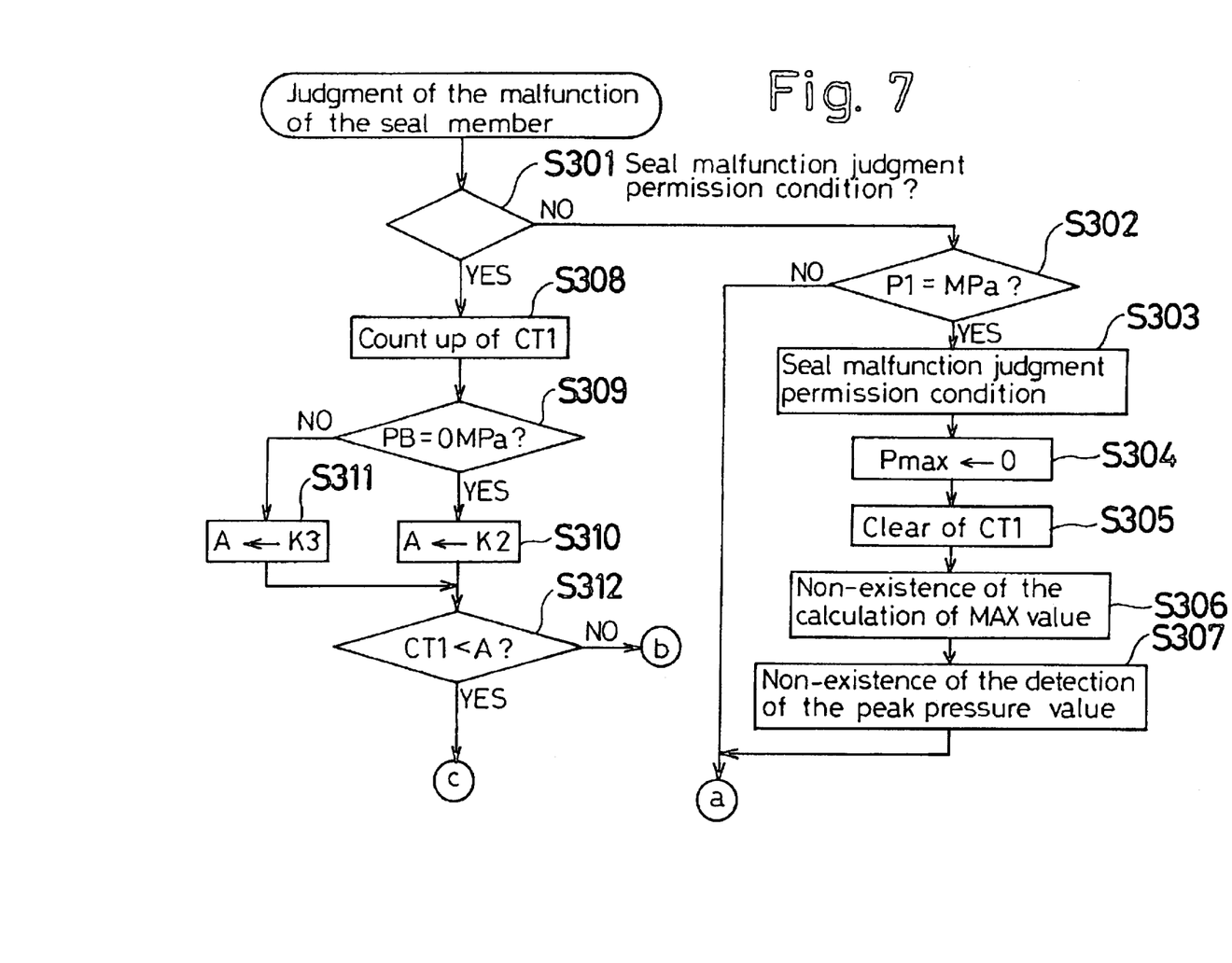
FIG. 7 is a flow chart showing a detail of the judgment of the malfunction of the seal member shown in FIG. 6.
Figure 8:
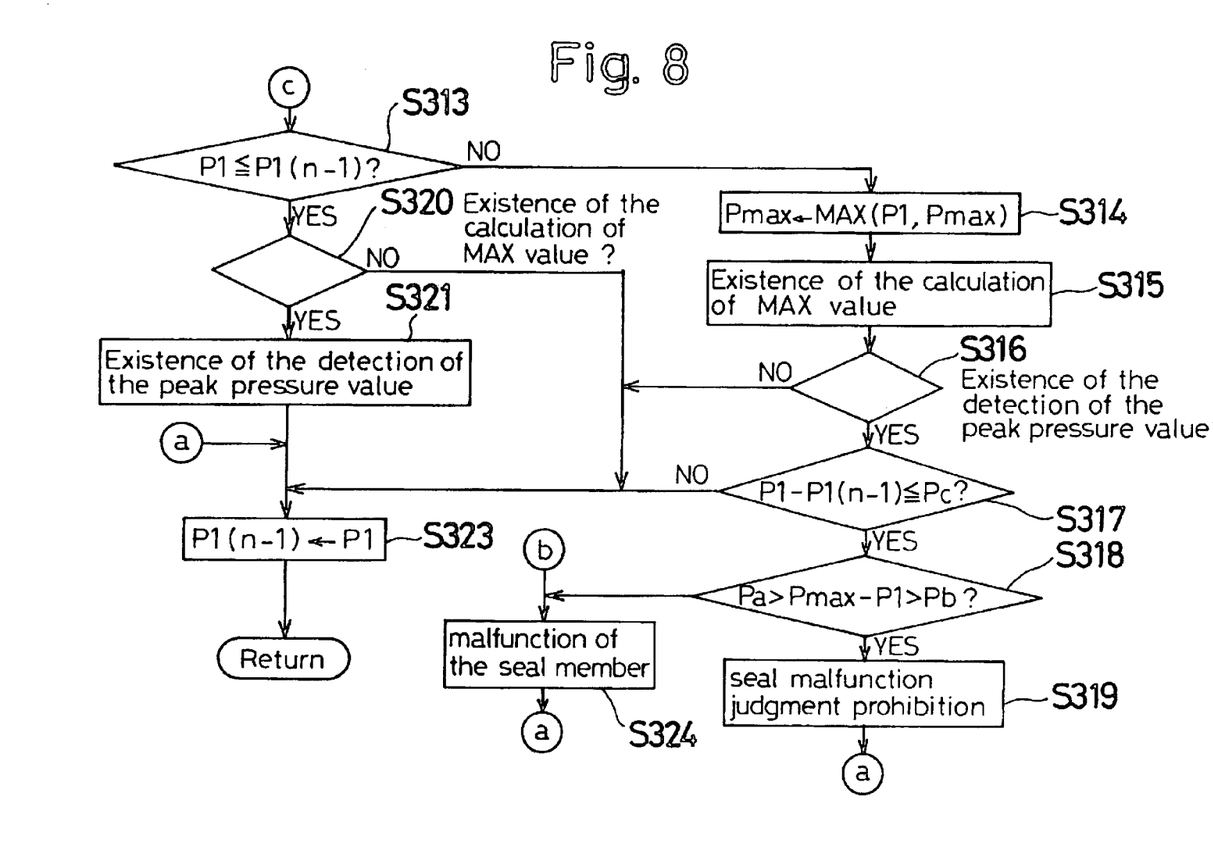
FIG. 8 is a flow chart showing a detail of the judgment of the malfunction of the seal member shown in FIG. 6.

FIG. 7 and FIG. 8 show the detail of the judgment of the malfunction of the seal member in the step S3. In FIG. 7, it is judged whether a condition is in a seal malfunction judgment permission condition at the step S301. Since the seal malfunction judgment permission condition is cleared at the initialization in the step S1 in FIG. 6, at the first operation period after the ignition switch is tuned on, the result of the judgment at the step S301 becomes NO and the step S302 is performed. In the step S302, it is judged whether the fluid pressure P1 is 0 (zero) Mpa. When the result of the judgment at the step S302 is YES, the seal malfunction judgment permission condition is set at the step S303. Then, the peak pressure value Pmax is rewritten to 0 (zero) at the step S304 and the timer value CT1 measuring the time A shown in FIGS. 3 to 5 is cleared at the step S305. Then, the non-existence of the calculation of MAX value is set at the step S306 and the non-existence of the detection of the peak pressure value is set at the step S307. Then, the step S323 in FIG. 8 is performed and the memorized pressure P1(n−1) is rewritten to the fluid pressure P1 which is calculated in the present operation period. Then, the step S4 in FIG. 6 is performed and the fluid pump 11 is begun to operate.

At the second operation period, the result of the judgment at the step S301 becomes YES and the timer value CT1 is counted up at the step S308. Then, it is judged whether the fluid pressure PB is 0 (zero) Mpa (whether the brake pedal 19 is depressed) at the step S309. When the result of the judgment at the step S309 is YES, the time A is rewritten to the predetermined value K2 at the step S310 and the step S312 is performed. When the result of the judgment at the step S309 is NO, the time A is rewritten to the predetermined value K3 at the step S311 and the step S312 is performed.

At the step S312, it is judged whether the timer value CT1 is under the time A. When the result of the judgment at the step S312 is YES, the step S313 is performed. In the step S313, it is judged whether the fluid pressure P1 calculated at the present operation period is below the memorized pressure P1(n−1), namely whether the increase of the fluid pressure P1 is stopped. When the result of the judgment at the step S313 is NO (the fluid pressure P1 is just increasing), the peak pressure value Pmax is rewritten to a larger one of the fluid pressure P1 or Pmax at the step S314 and then the existence of the calculation of the MAX value is set at the step S315. Then, it is judged whether the existence of the detection of the peak pressure value is set at the step S316. When the result of the judgment at the step S313 is YES and the result of the judgment at the step S321 is YES, the existence of the detection of the peak pressure value is set. If the fluid pressure P1 is just increasing after the starting of the fluid pump 11, the result of the judgment at the step S316 becomes NO and the step S4 in FIG. 6 is performed by way of the step S323. Accordingly, during the fluid pressure P1 increases after the starting of the fluid pump 11, Pmax is renewed at the step S314.

The change of the fluid pressure P1 is changed from the increase to the decrease after the starting of the fluid pump 11, the result of the judgment at the step S313 becomes YES. Accordingly, the step S321 is performed by way of the step S320. At the step S321, the existence of the detection of the peak pressure value is set and then the step S4 in FIG. 6 is performed by way of the step S323.

After that, when the fluid pressure P1 increases again after the starting of the fluid pump 11, the result of the judgment at the step S313 becomes NO and the step S316 is performed by way of the steps S314 and S315 in order. Then, since the result of the judgment at the step S316 becomes YES, the step S317 is performed and it is judged whether a difference value which the pressure P1(n−1) is subtracted from the fluid pressure P1 is below the predetermined value ΔP. This predetermined value ΔP is set to a magnitude which does not generate in the stable condition of the fluid pressure in the fluid passage 13 after the starting of the fluid pump 11. Accordingly, if the result of the judgment at the step S317 is YES, this means that the fluid pressure P1 becomes stable after the starting of the fluid pump 11 and the fluid pressure P1 in this time is a stable pressure value.

When the result of the judgment at the step S317 is NO, the step S4 in FIG. 6 is performed by way of the step S323. When the result of the judgment at the step S317 is YES, the step S318 is performed and it is judged whether the relationship Pa>Pmax-P1>Pb is satisfied. P-max-P1 corresponds to ΔP in FIGS. 3 and 4. Pa corresponds to the upper limit value of ΔP in FIG. 3 and Pb corresponds to the lower limit value of ΔP in FIG. 3. When the result of the judgment at the step S318 is YES, the seal malfunction judgment prohibition condition is set at the step S319 and the step S4 in FIG. 4 is performed. When the result of the judgment at the step S318 is NO, the malfunction of the seal member is set at the step S324 and then the step S4 in FIG. 6 is performed.

As shown in FIG. 5, when the peak pressure value Pmax is not detected even if the time A is past after the starting of the fluid pump 11, the existence of the detection of the peak pressure value is not set at the step S321. Thereby, a series of processes in FIG. 6 are repeated and before long the result of the judgment at the step S312 is NO. Then, the step S324 is performed and the malfunction of the seal member is set.

When it is judged at the step S302 that the fluid pressure P1 is not equal to 0 Mpa, the step S4 in FIG. 6 is performed by way of the step S323. This means that the judgment of the malfunction of the seal member is performed only when the fluid pressure in the fluid passage 13 increases from 0 (zero).

In the judgment of the malfunction of the seal member shown in FIGS. 7 and 8, when the difference value Pmax-P1 between the peak pressure value Pmax appeared before the time A is past and the stable fluid pressure P1 appeared after the appearance of the peak pressure exceeds to the lower limit value Pb and is below the upper limit value Pa, it is judged that the malfunction of the seal member generates.

Further, when the peak pressure value does not appear after the progress of the time A, it is judged that the malfunction of the seal member generates. However, the change of the fluid pressure in the inlet and outlet port at the change of the sealing function from normal condition to the malfunction is changed due to the shape of the seal member 14h of the bellows type accumulator 14 and the mounting structure of the seal member 14h. For example, there is a case in which the change of the fluid pressure in the inlet and outlet port is changed from FIG. 3 to FIG. 4 or there is a case in which the change of the fluid pressure in the inlet and outlet port is changed from FIG. 3 to FIG. 5. Accordingly, when the difference value Pmax-P1 between the peak pressure value Pmax appeared before the time A is past and the stable fluid pressure P1 appeared after the appearance of the peak pressure exceeds to the lower limit value Pb and is below the upper limit value Pa, or when the peak pressure value does not appear before the progress of the time A, it may be judged that the malfunction of the seal member generates.

Further, the judgment of the malfunction of the seal member may be performed when the fluid pressure P1 increases from the pressure value which is below the pressure P2 and which is larger than 0 (zero).

As mentioned above, according to the present invention, since it is able to detect the malfunction of the seal member of the bellows type accumulator, it is able to prevent the bellows from destroying due to the malfunction of the sealing function of the seal member.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations changes and equivalents which fall within the spirit and scope of the present invention as defined in the claims, be embraced thereby.

What we claim is:

1. A malfunction detection device of a bellows type accumulator for pressurized fluid comprising:

the bellows type accumulator including a shell which forms a pressure space, a bellows located in the pressure space and whose one end is fluid tightly fixed to one end wall of the shell and whose other end is fluid tightly fixed to a movable plate, a gas chamber which is formed inside of the bellows and in which pressurized gas is enclosed, a fluid chamber which is formed outside of the bellows and which communicates with an inlet and outlet port formed on the other end wall of the shell and a seal member which is provided on one face of the movable plate or the other end wall of the shell and which contacts with the one face of the movable plate or the other end wall of the shell for preventing the fluid from flowing from the fluid chamber to the inlet and outlet port, a pressure sensor which is provided between the inlet and outlet port and a fluid pump supplying the pressurized fluid to the bellows type accumulator and detects the fluid pressure in the inlet and outlet port into which the fluid in the fluid chamber is prevented from flowing and malfunction judgment means for judging a malfunction of the bellows type accumulator on the basis of a detection output of the pressure sensor, wherein the malfunction judgment means judges that a malfunction of the seal member generates when a difference between a peak pressure value appearing until a predetermined time is past after a start of pressure increase from a value below a predetermined value in the inlet and outlet port and a stable fluid pressure value appearing after an appearance of the peak pressure value is not within a predetermined range and/or when the peak pressure value does not appear until the predetermined time is past.

2. A malfunction detection device of a bellows type accumulator for pressurized fluid according to claim 1, wherein the seal member has a ring shaped sealing surface whose outer diameter is smaller than an outer diameter of a surface of the movable plate to which gas pressure is applied.

3. A malfunction detection devise of a bellows type accumulator for pressurized fluid according to claim 2, wherein the other end wall of the shell contacts with the seal member when the pressure in the inlet and outlet port is the value below the predetermined value.

4. A malfunction detection device of a bellows type accumulator for pressurized fluid according to the claim 3, wherein the malfunction judgement means changes the predetermined time in response to operation of a fluid pressure apparatus which is operated by the pressurized fluid supplied from the bellows type accumulator.

\* \* \* \* \*